United States Patent
Park et al.

(10) Patent No.: US 8,630,623 B2
(45) Date of Patent: Jan. 14, 2014

(54) CONTENT CONTROL APPARATUS AND METHOD THEREOF

(75) Inventors: Jonghoon Park, Seoul (KR); Nari Kim, Seoul (KR)

(73) Assignee: LG Electronics Inc., Seoul (KR)

(*) Notice: Subject to any disclaimer, the term of this patent is extended or adjusted under 35 U.S.C. 154(b) by 64 days.

(21) Appl. No.: 13/296,606

(22) Filed: Nov. 15, 2011

(65) Prior Publication Data

US 2012/0129496 A1    May 24, 2012

(30) Foreign Application Priority Data

Nov. 23, 2010  (KR) ........................ 10-2010-0117133

(51) Int. Cl.
| | |
|---|---|
| H04M 1/66 | (2006.01) |
| H04M 1/68 | (2006.01) |
| H04M 3/16 | (2006.01) |
| H04M 3/00 | (2006.01) |
| H04M 1/00 | (2006.01) |
| G06F 3/041 | (2006.01) |
| G06F 3/048 | (2013.01) |

(52) U.S. Cl.
USPC ........ 455/411; 455/418; 455/566; 455/550.1; 345/173; 715/835; 715/863

(58) Field of Classification Search
USPC ........................................................ 455/411
See application file for complete search history.

(56) References Cited

U.S. PATENT DOCUMENTS

| | | | |
|---|---|---|---|
| 2006/0189345 | A1 | 8/2006 | Suzuki et al. |
| 2009/0061837 | A1* | 3/2009 | Chaudhri et al. ............. 455/418 |
| 2010/0001967 | A1 | 1/2010 | Yoo |
| 2010/0127998 | A1* | 5/2010 | Hyun ............................ 345/173 |
| 2010/0159995 | A1* | 6/2010 | Stallings et al. .............. 455/566 |
| 2010/0235746 | A1* | 9/2010 | Anzures ....................... 715/723 |
| 2010/0306705 | A1* | 12/2010 | Nilsson ........................ 715/835 |
| 2010/0306718 | A1* | 12/2010 | Shim et al. ................... 715/863 |
| 2012/0009896 | A1* | 1/2012 | Bandyopadhyay et al. .. 455/411 |

FOREIGN PATENT DOCUMENTS

| | | |
|---|---|---|
| EP | 1694040 A2 | 8/2006 |
| JP | 2006-229730 A | 8/2006 |

* cited by examiner

*Primary Examiner* — Timothy Pham
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit including a touch screen; and a controller configured to enter the touch screen into a locked state, to display a lock screen and an application program icon for executing an application program on the lock screen when entering the locked state.

14 Claims, 7 Drawing Sheets

CONTENT CONTROL APPARATUS AND METHOD THEREOF

CROSS-REFERENCE TO A RELATED APPLICATION

Pursuant to 35 U.S.C. §119(a), this application claims the benefit of earlier filing date and right of priority to Korean Application No. 10-2010-0117133 filed on Nov. 23, 2010, the contents of which are incorporated by reference herein in their entirety.

BACKGROUND OF THE INVENTION

1. Field of the Invention

The present invention relates to a content control apparatus and method thereof.

2. Background of the Invention

In general, a content control apparatus controls various contents such as videos, photos, and map data according to an input signal entered by a user. However, some of the functions provided by the content control apparatus are limited making it cumbersome for a user to operate.

SUMMARY OF THE INVENTION

Accordingly, one object of the present invention is to address the above-noted and other problems of the related art.

Another object of the present invention is to provide a contents control apparatus and corresponding method for allowing specific applications to be executed in a lock screen mode.

To achieve this and other objects, one aspect of the present invention provides a mobile terminal including a wireless communication unit configured to wirelessly communicate with at least one other terminal; a display unit including a touch screen; and a controller configured to enter the touch screen into a locked state, to display a lock screen on the display unit and to display an application program icon for executing an application program on the lock screen when entering the locked state.

In another aspect, the present invention provides a method of controlling a mobile terminal. The method includes allowing, via a wireless communication unit of the mobile terminal, wireless communication with at least one other terminal; entering, via a controller controlling a touch screen of a display unit of the mobile terminal, the touch screen into a locked state; displaying, via the controller, a lock screen on the display unit; and displaying via the controller, an application program icon for executing an application program on the lock screen when entering the locked state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a content control apparatus and method thereof capable of easily and quickly implementing a user's desired application program even when a touch screen of the display unit is in a locked state will be described in detail with reference to FIGS. 1-10.

Figure 1:
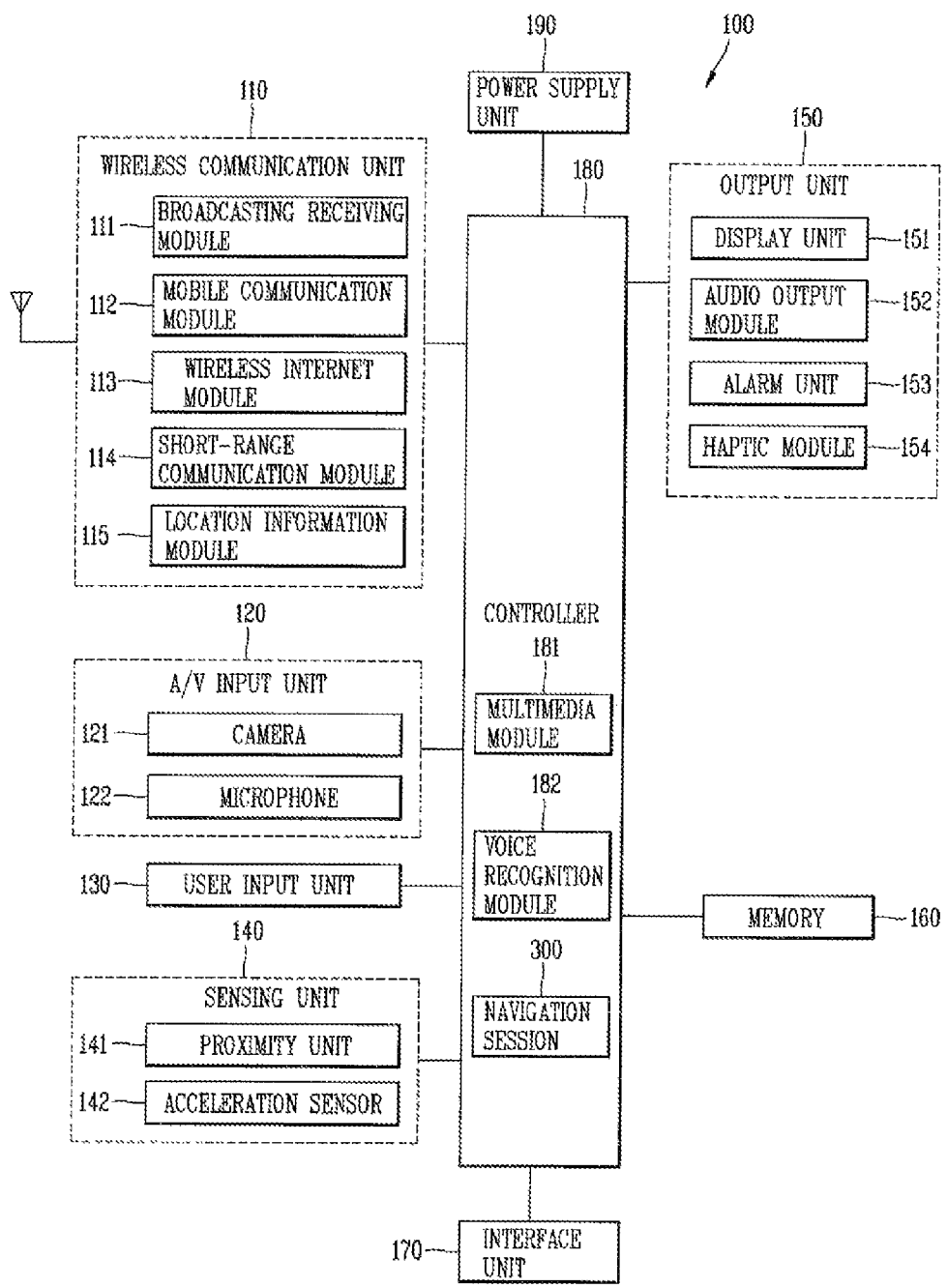
FIG. 1 is a block diagram illustrating a mobile communication terminal to which a content control apparatus according to embodiments of the present invention is applied.

In particular, FIG. 1 is a block diagram illustrating a mobile communication terminal 100 to which a content control apparatus according to embodiments of the present invention is applied. The mobile terminal (mobile phone) 100 may be implemented in various forms. For example, the mobile communication terminal 100 may include a portable phone, a smart phone, a notebook computer, a digital broadcast receiver, a personal digital assistant (PDA), a portable multimedia player (PMP), and the like.

As illustrated in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, a power supply unit 190, and the like. All the elements of the mobile communication terminal 100, as illustrated in FIG. 1, are not necessarily required, and therefore, the mobile communication terminal 100 may be implemented with greater or less elements than the elements as illustrated in FIG. 1.

The wireless communication unit 110 generally includes one or more elements allowing radio communication between the mobile communication terminal 100 and a wireless communication system, or allowing radio communication between radio communication the mobile communication terminal 100 and a network in which the mobile communication terminal 100 is located. For example, in FIG. 1, the wireless communication unit 110 includes a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. Further, the broadcast management server corresponds to a server that generates and transmits a broadcast signal and/or broadcast associated information or a server that receives a previously generated broadcast signal and/or broadcast associated information and transmits to the mobile communication terminal 100. The broadcast associated information corresponds to information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may be provided through a mobile communication network, and in this instance, the broadcast associated information may be received by the mobile communication module 112. The broadcast signal may exist in various forms, such as an electronic program guide (EPG) of the digital multimedia broadcasting (DMB) system, an electronic service guide (ESG) of the digital video broadcast-handheld (DVB-H) system, and the like.

The broadcast receiving module 111 can receive a broadcast signal using various types of broadcast systems. In particular, the broadcast receiving module 111 can receive a digital broadcast signal using a digital broadcast system such as the digital multimedia broadcasting-terrestrial (DMB-T) system, the digital multimedia broadcasting-satellite (DMB-S) system, the media forward link only (MediaFLO) system, the digital video broadcast-handheld (DVB-H) system, the integrated services digital broadcast-terrestrial (ISDB-T) system, and the like. The broadcast receiving module 111 is configured to be suitable for every broadcast system that provides a broadcast signal as well as the above-mentioned digital broadcast systems. The broadcast signal and/or broadcast-associated information received through the broadcast receiving module 111 can also be stored in the memory 160.

Further, the mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 corresponds to a module for supporting wireless Internet access. The wireless Internet module 113 may be built-in or externally installed to the mobile communication terminal 100, and may use a wireless Internet access technique including a WLAN (Wireless LAN), Wi-Fi, WiBro (Wireless Broadband), WiMax (World Interoperability for Microwave Access), HSDPA (High Speed Downlink Packet Access), and the like.

In addition, the short-range communication module 114 corresponds to a module for supporting a short-range communication, and may use a short-range communication technology including Bluetooth, Radio Frequency Identification (RFID), Infrared Data Association (IrDA), Ultra Wideband (UWB), ZigBee, and the like.

The location information module 115 is a module for checking or acquiring a location of the mobile terminal. A GPS module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may also be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable thereto.

Further, the location information module 115 may include a geomagnetic sensor and/or gravity sensor for detecting a direction. For example, the location information module 115 may detect the direction of the mobile communication terminal 100 (for example, east, west, south and north) to implement navigation using augmented reality through the geomagnetic sensor (electronic compass). The location information module 115 may detect in which direction gravity acts through the gravity sensor (G-sensor), and display a vertical screen when the user holds the mobile communication terminal 100 in a vertical direction and automatically rotate the screen when the user holds it in a horizontal direction to display a wide screen. Furthermore, when the user views a video, the location information module 115 rotates the screen according to a direction of the mobile communication terminal 100 held by the user through the gravity sensor (G-sensor), thereby allowing the user to view an image in a convenient manner.

The A/V (audio/video) input unit 120 receives an audio or video signal, and in FIG. 1, includes a camera 121 and a microphone 122. The camera 121 processes an image frame, such as still picture or video, obtained by an image sensor in a video phone call or image capturing mode. The processed image frame can then be displayed on a display unit 151.

Further, the image frames processed by the camera 121 may be stored in the memory 160 (or other storage medium) or transmitted through the wireless communication unit 110. Two or more cameras 121 may also be provided according to the configuration type and/or use environment of the mobile terminal 100.

The microphone 122 receives an external audio signal in a phone call mode, a recording mode, a voice recognition mode, and the like, and processes the audio signal into electrical voice data. The processed voice data can then be converted and output into a format capable of being transmitted to a mobile communication base station through the mobile communication module 112 in the phone call mode. The microphone 122 may also implement various types of noise canceling algorithms to cancel noise generated in a procedure of receiving the external audio signal.

Further, the user input unit 130 generates input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with the display unit 151, the user input unit 130 may be called a touch screen.

In addition, the sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, the sensing unit 140 can sense an opened or closed state of the slide phone. Furthermore, the sensing unit 140 takes charge of a sensing function associated with whether or not power is supplied from the power supply unit 190, whether or not an external device is coupled with the interface unit 170.

The interface unit 170 performs a role of interfacing with all external devices connected to the mobile communication terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority for using the mobile communication terminal 100, which may include a User Identity Module (UIM), a Subscriber Identity Module (SIM), a Universal Subscriber Identity Module (USIM), and the like. Also, the device provided with the identification module ('identification device') may be implemented as a smart card. Hence, the identification device can be coupled to the mobile communication terminal 100 via a port. The interface unit 170 may receive data or power from an external device and transfer the received data or power to each constituent element in the mobile communication terminal 100, or transmit data within the mobile communication terminal 100 to the external device.

In addition, the output unit 150 is configured to provide an output for audio signal, video signal, or alarm signal, and the output unit 150 may include the display unit 151, an audio output module 152, an alarm unit 153, and the like. The display unit 151 displays or outputs information processed in the mobile communication terminal 100. For example, when the mobile communication terminal 100 is in a phone call mode, the display unit 151 can display a User Interface (UI) or a Graphic User Interface (GUI) associated with a call. When the mobile communication terminal 100 is in a video call mode or image capturing mode, the display unit 151 can display a captured image and/or received image, a UI or GUI.

The display unit 151 may also include at least one of a Liquid Crystal Display (LCD), a Thin Film Transistor-LCD (TFT-LCD), an Organic Light Emitting Diode (OLED) display, a flexible display, and a three-dimensional (3D) display. Furthermore, two or more display units 151 may be used. For example, an external display unit and an internal display unit can be provided in the mobile communication terminal 100.

Meanwhile, when the display unit 151 and a sensor for detecting a touch operation ('touch sensor') are formed with an interlayer structure ('touch screen'), the display unit 151 may be also used as an input device in addition to an output device. The touch sensor may be configured in a form of, for example, touch film, touch sheet, touch pad, or the like.

Furthermore, the touch sensor may be configured to convert a change such as pressure applied to a specific area of the display unit 151 or capacitance generated on a specific area of the display unit 151 into an electrical input signal. The touch sensor may be configured to detect a touch input pressure as well as a touch input position and a touch input area. When there is a touch input to the touch sensor, a signal (or signals) corresponding to the touch input is sent to a touch controller. The touch controller processes the signal (or signals) and then sends the corresponding data to a controller 180. By this, the controller 180 can detect whether or not any region is touched on the display unit 151. A proximity-touch means a state that a pointer approaches to a screen while being apart a predetermined distance from the screen without actually touching the screen.

Further, the proximity unit 141 may be arranged in an inner region of the mobile terminal 100 surrounded by a touch screen or may be arranged adjacent to the touch screen. The proximity unit 141 is a sensor for detecting the presence or absence of an object approaching to a certain detection surface or an object that exists nearby by using the force of electromagnetism or infrared rays without a mechanical contact. Thus, the proximity unit 141 has a considerably longer life span compared with a contact type sensor and can be utilized for various purposes.

Examples of the proximity unit 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this instance, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen means a position where the pointer is positioned to correspond vertically to the touch screen when the pointer is proximately touched.

Furthermore, the proximity unit 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can be output to the touch screen.

Further, in FIG. 1, the sensing unit 140 also includes an acceleration sensor 142. The acceleration sensor 142 is a device for transforming an acceleration change in any one direction into an electrical signal, which is widely used with the development of micro-electromechanical systems (MEMS) technology. There are various kinds of acceleration sensors 142 from the one that is built in an airbag system of a vehicle to measure a large value of acceleration used to detect collision, to the one that measures a small value of acceleration used as an input means to recognize the detailed operation of a human hand. The acceleration sensor 142 is generally configured by providing two or three axes in a package, and may use only one z-axis in some instances. Accordingly, when the x-axis or y-axis acceleration sensor is used instead of the z-axis acceleration sensor, the acceleration sensor can be placed upright on a main substrate using a separate piece of substrate.

In addition, the audio output module 152 outputs audio data received from the wireless communication unit 110 or stored in the memory 160 in a call signal reception mode, a call mode, a record mode, a voice recognition mode, a broadcast reception mode, and the like. Also, the audio output module 152 can output an audio signal associated with the function performed by the mobile terminal 100 (for example, a call signal reception sound, a message reception sound, etc.). The audio output module 152 may also include a receiver, a speaker, a buzzer, and the like.

The alarm unit 153 outputs a signal to notify the occurrence of an event of the mobile terminal 100. Examples of events that could occur in the mobile terminal 100 include call signal reception, message reception, a key signal input, a touch input, and the like. In addition to an audio or video output, the alarm unit 153 can output a signal in a different manner to notify the occurrence of an event. For example, the alarm unit 153 can output a vibration. When a call signal or message is received, the alarm unit 153 can vibrate the mobile terminal 100 through vibration. When a key signal is input, the alarm unit 153 can vibrate the mobile terminal 100 through vibration using a feedback to the key signal input. Thus, the user can recognize an occurrence of the event through vibration as described above. The signal for notifying an occurrence of the event may also be output through the display unit 151 or the audio output module 152.

In addition, the haptic module 154 generates various tactile effects felt by the user. A typical example of the tactile effects generated by the haptic module 154 is vibration. An intensity, pattern, or the like, generated by the haptic module 154 can also be controlled. For example, different vibrations may be combined and output or sequentially output. The haptic module 154, in addition to vibration, can generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 may also be implemented to feel a tactile effect through muscular senses by a finger or arm of the user as well as to transfer a tactile effect through direct contact. Two or more haptic modules 154 may also be used. The haptic module 154 may be provided at a place frequently being contacted by the user in a vehicle when the mobile terminal is a navigation apparatus. For example, the haptic module 154 may be provided on a steering wheel, a gearshift lever, a seat, or the like.

Further, the memory 160 stores software programs for processing and controlling the controller 180, or temporarily stores data (for example, a phonebook, message, still image, video, and the like) which are input and/or output.

The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile communication terminal 100 may access a web storage that performs the storage function of the memory 160 over the Internet, or operate in association with the web storage.

As discussed above, the interface unit 170 serves as an interface to every external device that may be connected with the mobile terminal 100. For example, the interface unit 170 may include a wired or wireless headset port, an external battery charger port, a wired or wireless data port, a memory card port, a ports for connecting a device having an identification module, an audio input/output (I/O) port, a video input/output (I/O) port, an earphone port, and the like. Here, the identification module, as a chip that stores various data for authenticating the authority to use the mobile terminal 100, may include a user identity module (UIM), a subscriber identity module (SIM), a universal subscriber identity module (USIM), and the like. In addition, the device having the identification module ('identifying device') may be made in a form of smart card. Accordingly, the identifying device may be connected with the mobile terminal 100 through a port. The interface unit 170 is provided to receive data or power from an external device and transfer the received data or power to every element within the mobile terminal 100 or may be used to transfer data within the mobile terminal to an external device.

When the mobile terminal 100 is connected with an external cradle, the interface unit 170 serves as a conduit to allow power from the cradle to be supplied therethrough to the mobile terminal 100 or serves as a conduit to allow various command signals input from the cradle to be transferred to the mobile terminal 100 therethrough. Various command signals or the power input from the cradle may operate as a signal for recognizing when the mobile terminal is properly mounted on the cradle.

The controller 180 generally controls a general operation of the mobile terminal 100. For example, the controller 180 performs a control and processing operation associated with a voice call, a data communication, a video phone call, and the like. In addition, in FIG. 1, the controller 180 includes a multimedia module 181 for reproducing multimedia content. The multimedia module 181 may be provided within the controller 180 or may be separately provided from the controller 180.

The controller 180 can perform a pattern recognition processing to recognize handwriting or picture-drawing input performed on the touch screen as a character or image, respectively. Further, the power supply unit 190 receives external or internal power to supply the power used for an operation of each element under a control of the controller 180.

The function of an element applied to the mobile terminal 100 may be implemented in a computer-readable medium using software, hardware, or any combination thereof. For a hardware implementation, the function may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180. In addition, the voice recognition module 182 recognizes speech uttered by a user, and performs a relevant function based on the recognized voice signal.

A navigation session 300 applied to the mobile communication terminal 100 displays a travel path on map data.

In addition, a content control apparatus applied to the mobile communication terminal 100 may include a controller configured to display an icon for implementing an application program (content) on a lock screen when the touch screen is the lock screen (in a locked state). The application program may be downloaded by the user from a server. The application program may also be a variety of application programs, such as a game program, an entertainment program, an education program, a message management program, a calendar management program, a photo management program, a weather providing program, and the like, and those programs are stored in the storage unit.

The detailed description of the elements in a content control apparatus applied to the mobile communication terminal 100 according to embodiments of the present invention will be described later with reference to FIGS. 3-10.

Next, the configuration of a telematics terminal 200 to which a control content apparatus according to embodiments of the present invention is applied will be described with reference to FIG. 2. In particular, FIG. 2 is a block diagram illustrating a telematics terminal 200 to which a content control apparatus according to embodiments of the present invention is applied.

Figure 2:
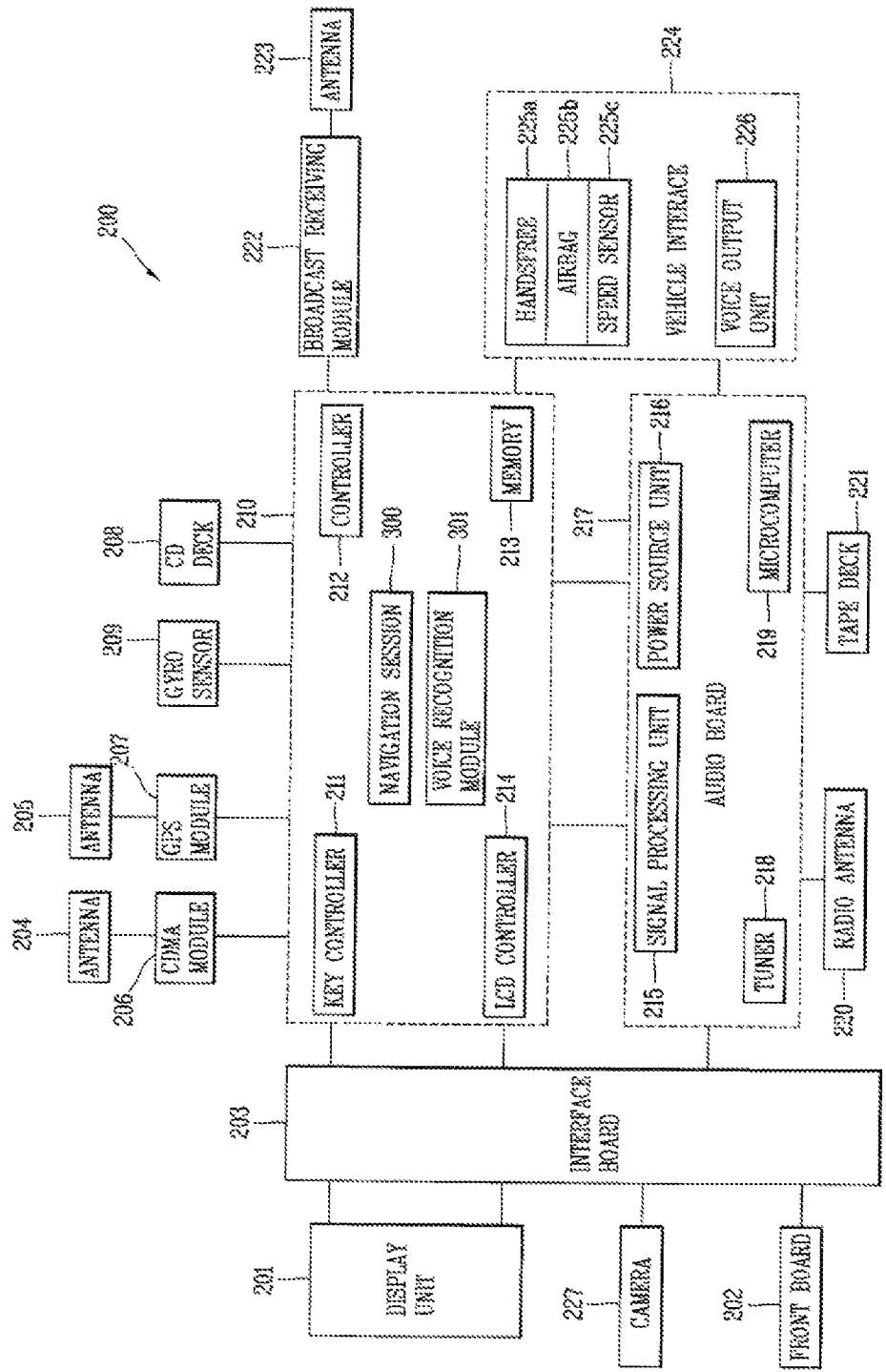
FIG. 2 is a block diagram illustrating a telematics terminal to which a content control apparatus according to embodiments of the present invention is applied.

As illustrated in FIG. 2, the telematics terminal 200 includes a central processing unit (CPU) 212 for performing an overall control of the telematics terminal 200, a memory 213 for storing a variety of information, a key controller 211 for controlling a variety of key signals, and a main board 210 having an LCD controller 214 for controlling an liquid crystal display device (LCD) therein.

The memory 213 stores map information (map data) for displaying road guide information on a digital map. In addition, the memory 213 stores information for an algorithm of controlling traffic information collection to allow an input of traffic information depending on a road condition in which a vehicle is currently traveling, and for controlling the algorithm.

The main board 210 includes a code division multiple access (CDMA) module 206 serving as a mobile communication terminal built in a vehicle which is given with a unique device number, a GPS module 207 for receiving a GPS signal to guide a location of a vehicle, track a traveling path from a departure to a destination, etc., and for transmitting traffic information collected by the user as a global positioning system (GPS) signal, a CD deck 208 for reproducing a signal recorded on a compact disk (CD), a gyro sensor 209, and the like. The CDMA module 206 and the GPS module 207 are configured to transmit and receive a signal through antennas 204 and 205.

In addition, a broadcast receiving module 222 is connected to the main board 210 and receives broadcast signals through the antenna 223. The main board 210 is connected via an interface board 203 to a display unit (LCD) 201 controlled by the LCD controller 214, a front board 202 controlled by a key controller 211, and a camera 227 for capturing an inside and/or outside of the vehicle. The display unit 201 displays a variety of video signals and text signals, and the front board 202 includes buttons for allowing an input of a variety of key signals so as to provide a key signal corresponding to a button selected by the user to the main board 210. In addition, the display unit includes a proximity sensor and a touch sensor (touch screen) of FIG. 2.

Further, the front board 202 includes a menu key for allowing a direct input of traffic information, and the menu key may be configured to be controlled by the key controller 211. The audio board 217 is connected to the main board 210 and processes a variety of audio signals. In FIG. 1, the audio board 217 includes a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 is configured to have a radio antenna 220 for receiving a radio signal and a tape deck 221 for reproducing an audio tape. The audio board 217 may further include an audio output unit (amplifier) 226 for outputting a voice signal processed by the audio board 217.

The audio output unit (amplifier) 226 is connected to a vehicle interface 224. In other words, the audio board 217 and the main board 210 are connected to the vehicle interface 224. A hands-free unit 225*a* for inputting a voice signal, an airbag 225*b* for passenger safety, a speed sensor 225*c* for detecting a vehicle speed and the like may be connected to the vehicle interface 224. The speed sensor 225*c* calculates a vehicle speed, and provides the calculated vehicle speed information to the central processing unit 212.

Meanwhile, the mobile vehicle navigation apparatus 300 applied to the telematics terminal 200 generates road guide information based on map data and current vehicle location information, and notifies the generated road guide information to the user. Further, the display unit 201 senses a proximity touch within the display window through a proximity sensor. For example, when a pointer (for example, finger or stylus pen) is proximity-touched, the display unit 201 detects the position of the proximity touch, and outputs position information corresponding to the detected position to the controller 212. The voice recognition device (or voice recognition module) 301 recognizes speech uttered by a user, and performs a relevant function based on the recognized voice signal.

Also, a content control apparatus applied to the telematics terminal 200 may include a controller configured to display an icon for implementing an application program (content) on a lock screen when the touch screen of the display unit is the lock screen (in a locked state). The application program may be downloaded by the user from a server. The application program may be a variety of application programs, such as a game program, an entertainment program, an education program, a message management program, a calendar management program, a photo management program, a weather providing program, and the like, and those programs are stored in the storage unit.

The detailed description of elements in a content control apparatus applied to the telematics terminal 200 according to embodiments of the present invention will be described with reference to FIGS. 3-10.

Next, a content control apparatus and method thereof according to the first embodiment of the present invention will be described with reference to FIGS. 3-6. The control content apparatus and method thereof according to the first embodiment of the present invention may be applicable to the mobile communication terminal 100, the telematics terminal 200, and a video conference terminal, as well as applicable to a smart phone, a notebook computer, a digital broadcast receiver, a personal digital assistant (PDA), a portable multimedia player (PMP), a desktop computer, a television, various video player, and the like.

Figure 3:
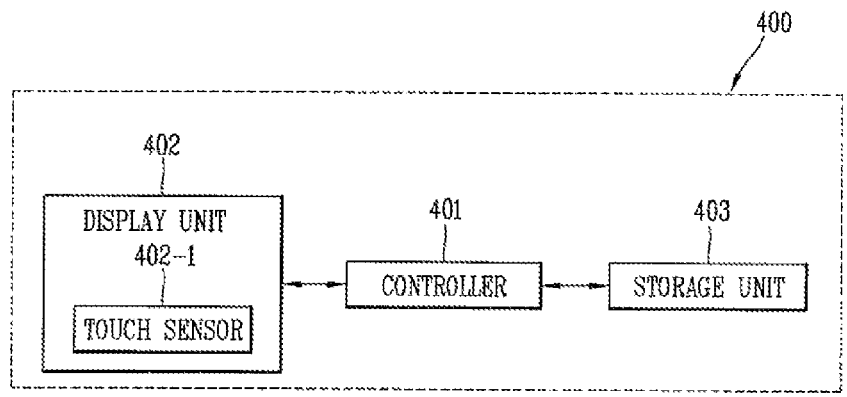
FIG. 3 is a block diagram illustrating a content control apparatus according to the first embodiment of the present invention.

FIG. 3 is a block diagram illustrating a content control apparatus 400 according to the first embodiment of the present invention.

As illustrated in FIG. 3, the content control apparatus 400 includes a display unit 402 having a touch screen, and a controller 401 configured to display an icon for implementing an application program (content) on a lock screen when the touch screen is in a locked state. The application program may be downloaded from a server by the user. The application program may also be a variety of application programs, such as a game program, an entertainment program, various education programs, a message management program, a calendar management program, a photo management program, a weather providing program, and the like, and those programs are stored in the storage unit 403.

The controller 401 may also display an icon for lock release on the display unit 402 when the touch screen is in a locked state. Further, the controller 401 activates only a first display region and a second display region on the display unit 402 when the touch screen is in a locked state (i.e., all other display regions are locked such that touch input to the other display regions are ignored by the controller), and display the icon for implementing the application programs in the first display region, and displays the icon for lock release in the second display region. In addition, the lock screen displayed during the locked state without the displayed application icon and lock release icon corresponds to any touch input on the locked screen being ignored by the controller (i.e., because all of the touch screen is in the locked state). The lock screen can also include only the release icon for unlocking the touch screen. The present invention advantageously also displays the application program icons allowing the user to execute particular applications even in the touch screen locked state.

In addition, the controller 401 may display a window for requesting a password on the display unit 402 when the icon for lock release is touched, and display a background window on the display unit 402 when the password is entered. The application program may be at least any one of a recently used application program, a most frequently implemented application program, and a user's selected application program, for example.

The controller 401 can implement an application program linked to a selected icon when the icon displayed on the display unit 402 is selected when the touch screen is in a locked state. The controller 401 may determine whether an icon (representative image or thumbnail image) linked to the application program is touched by the user through a touch sensor 402-1. The touch sensor 402-1 may also be configured to detect a pressure at the time of touching as well as its touched location and area.

Figure 4:
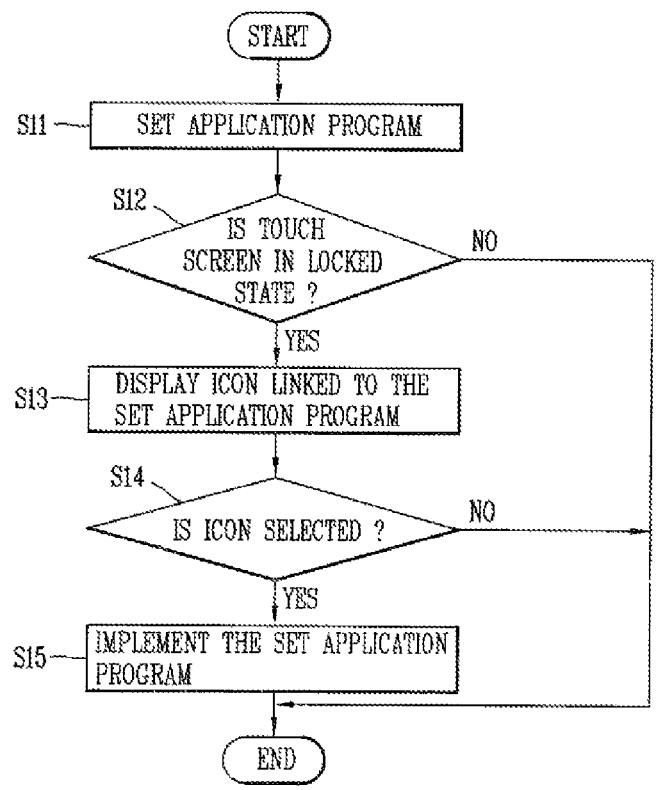
FIG. 4 is a flow chart illustrating a content control method according to the first embodiment of the present invention.

Next, a content control method according to the first embodiment of the present invention will be described with reference to FIGS. 4-6. In particular, FIG. 4 is a flow chart illustrating a content control method according to the first embodiment of the present invention. As shown in FIG. 4, the controller 401 sets an application program to be displayed on the display unit 402 when the touch screen is in a locked state according to the user's request (S11).

Figure 5:
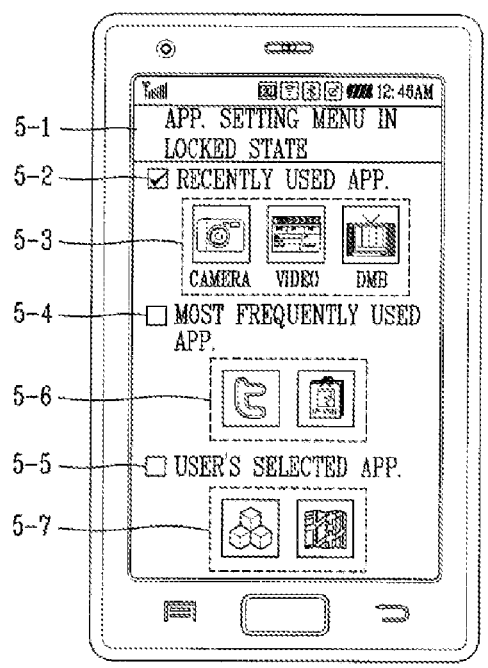
FIG. 5 is an overview illustrating an application program (APP) setting menu according to the first embodiment of the present invention.

In more detail, FIG. 5 is an overview illustrating an application program (APP) setting menu according to the first embodiment of the present invention. As illustrated in FIG. 5, the application program (APP) setting menu is a menu for setting an application program to be displayed on the display unit 402 when the touch screen is in a locked state.

As shown, the application program (APP) setting menu includes at least any one of a first item 5-2 for setting recently used application program(s) (contents); a second item 5-4 for setting most frequently implemented application program(s) (most frequently used APP); and a third item 5-5 for setting user's selected application program(s).

The controller 401 also displays an icon 5-3 for implementing the recently used application program(s) on the first item 5-2 when the first item 5-2 within the application program (APP) setting menu is selected by the user, displays an icon 5-6 for implementing the most frequently implemented application program(s) on the second item 5-4 when the second item 5-4 within the application program (APP) setting menu is selected by the user, and displays an icon 5-7 for implementing the user's selected application program(s) on the third item 5-5 when the third item 5-5 within the application program (APP) setting menu is selected by the user. Accordingly, the user can set an application program to be displayed on the display unit 402 (touch screen) when the touch screen is in a locked state through the application program (APP) setting menu.

As shown in FIG. 4, the controller 401 also determines whether the touch screen is in a locked state (S12). When the touch screen is in the locked state (Yes in S12), the controller 401 displays an icon or icon(s) linked to the application program(s) for implementing application program(s) set by the user when the touch screen is in the locked state (S13).

The controller 401 may also display icons indicating the application programs as well as an icon for releasing the lock on the display unit 402 when the touch screen is in the locked state (touch screen lock mode). Further, the controller 401 may display a window for requesting a password when the icon for lock release is touch selected by the user, and display a background window (main display or main windows) on the display unit 402 when the password is entered. For example, the controller 401 can display an icon (or icons) indicating the application program(s) set by the user in a first display region of the display unit 402 when the touch screen is in the locked state, and display the lock release icon in a second display region of the display unit 402, and activate only the first and second display regions on the display unit 402, and deactivate all display regions excluding the first and second display regions.

The controller 401 then determines whether an icon (or icons) displayed on the display unit 402 are selected by the user when the touch screen is in the locked state (S14). For example, the controller 401 may determine whether an icon (representative image or thumbnail image) for implementing the application program is touched by the user through the touch sensor 402-1. The touch sensor 402-1 may also be configured to detect a pressure at the time of touching as well as its touched location and area. The controller 401 then executes an application program linked to a selected icon when the icon (or icons) displayed on the display unit 402 is (are) selected by the user when the touch screen is in the locked state (S15).

Figure 6:
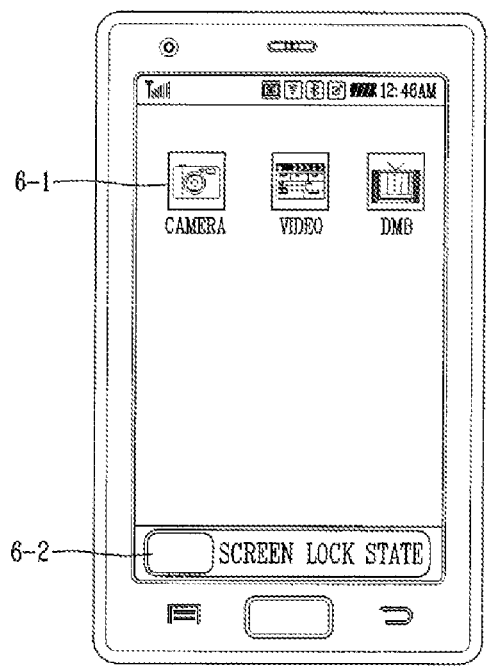
FIG. 6 is an overview illustrating icons displayed on a lock screen when a touch screen is in a locked state according to the first embodiment of the present invention.

Thus, as shown in FIG. 6, the controller 401 displays icons 6-1 for executing corresponding application programs and lock release icon 6-2 for releasing the locked touch screen when the touch screen is in the locked state. The controller 401 may also display the icon (or icons) for executing the set application program with a transparent or semi-transparent color.

Further, the controller 401 may display an icon of a corresponding application program set in the application program (APP) setting menu when a specific key (for example, "call" key) is selected when the touch screen is in the locked state. The controller 401 may also generate and display a pop-up window indicating the icons of the application programs set in the application program (APP) setting menu when a specific key (for example, "call" key) is selected when the touch screen is in the locked state.

In addition, the controller 401 can remove (or stop displaying) the pop-up window when the pop-up window displayed is moved by a slide touch (for example, moved in a predetermined direction in the state of the pop-up window being touched).

As a result, according to a content control apparatus and method thereof in accordance with the first embodiment of the present invention, if an icon displayed on the display unit 402 is selected when the touch screen is in the locked state, then an application program linked to the selected icon is executed, thereby easily and quickly implementing the user's desired application program even when the touch screen is in the locked state. In other words, a corresponding application can be executed when the touch screen is in the locked state in a sleep mode (or resume mode). Thus, the user does not have to use several touch operations to execute a desired application program in the locked state.

Next, a content control method according to the second embodiment of the present invention will be described with reference to FIGS. 4-7. In particular, FIG. 7 is a flow chart illustrating a content control method according to the second embodiment of the present invention.

Figure 7:
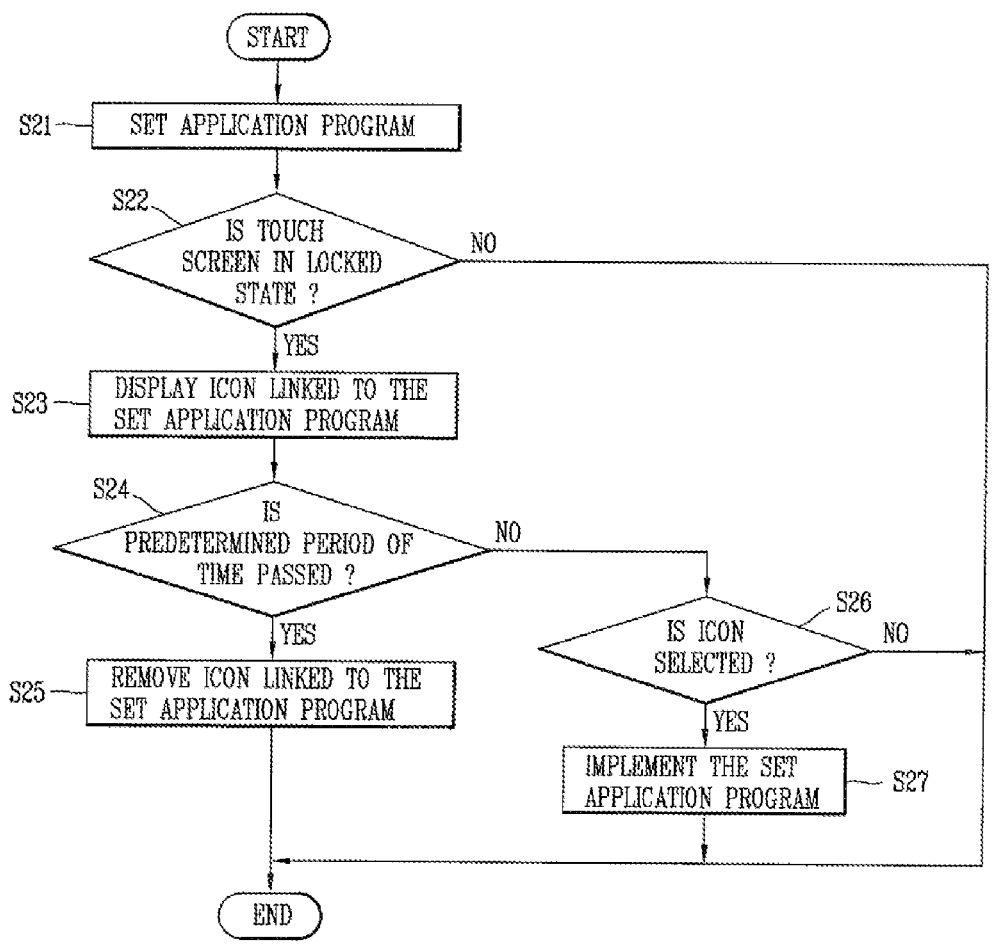
FIG. 7 is a flow chart illustrating a content control method according to the second embodiment of the present invention.

As shown in FIG. 7, the controller 401 sets an application program to be displayed on the lock screen when the touch screen is in the locked state according to the user's request (S21). For example, as discussed above with respect to FIG. 4, the application program (APP) setting menu can be used to set an application program to be displayed on the display unit 402 when the touch screen is in the locked state. The description of FIG. 4 was recited above so will not be repeated.

The controller 401 then determines whether the touch screen is in the locked state (S22). When the touch screen is in the locked state (Yes in S24), the controller 401 searches or reads application program(s) set by the user and displays the corresponding read icon(s) on the display unit 402 (S23).

As discussed previously, the controller 401 can also display an icon for releasing the lock on the display unit 402, display a window for requesting a password when the lock release icon is touched by the user, and display a background window (main display or main windows) on the display unit 402 when the password is entered. For example, the controller 401 can display an icon (or icons) indicating the application program(s) set by the user in the first display region of the display unit 402 and display the lock release icon in the second display region of the display unit 402 when the touch screen is in the locked state. The controller 401 can also activate only the first and second display regions, and deactivate all display regions excluding the first and second display regions.

The controller 401 then determines whether a predetermined amount of time (for example, 5-10 minutes) has passed while the touch screen is in the locked state (S24). If the predetermined amount of time has passed (Yes in S24), the controller 401 removes (stops displaying) the icon(s) on the lock screen (S25). Thus, the controller 401 can reduce the battery consumption power of the mobile terminal by not continuing to display the icons.

If the predetermined amount of time has not passed (NO in S24), the controller 401 determines if an application icon has been selected (S26) while the touch screen is in the locked state. For example, the controller 401 can determine, via the touch sensor 402-1, whether an icon (representative image or thumbnail image) for executing the application program is touched by the user.

If an icon (or icons) displayed on the display unit 402 is (are) selected by the user when the touch screen is in the locked state and within the predetermined amount of time (Yes in S26), the controller 401 executes the application program(s) linked to the selected icon(s) (S27). As a result, according to the second embodiment of the present invention, an application program linked to the icon is implemented only when the touch screen is in the locked state and within a predetermined period of time, thereby reducing the battery consumption power of the mobile terminal.

Figure 8:
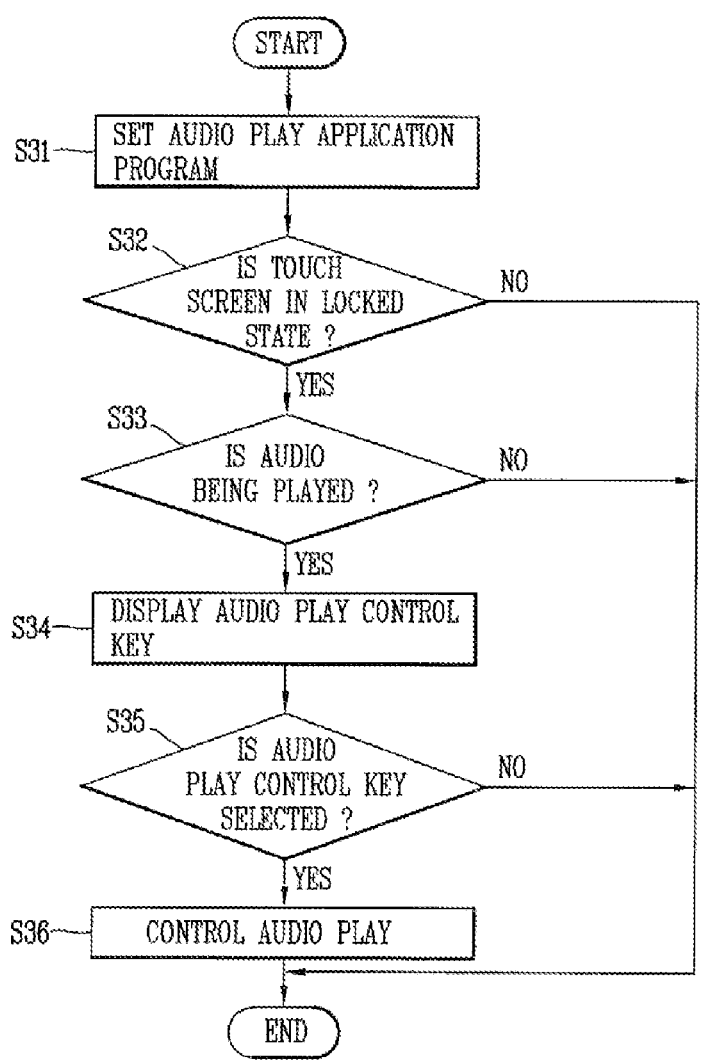
FIG. 8 is a flow chart illustrating a content control method according to the third embodiment of the present invention.

Next, a content control method according to the third embodiment of the present invention will be described with reference to FIGS. 4 and 8-10. In particular, FIG. 8 is a flow chart illustrating a content control method according to the third embodiment of the present invention.

Figure 9:
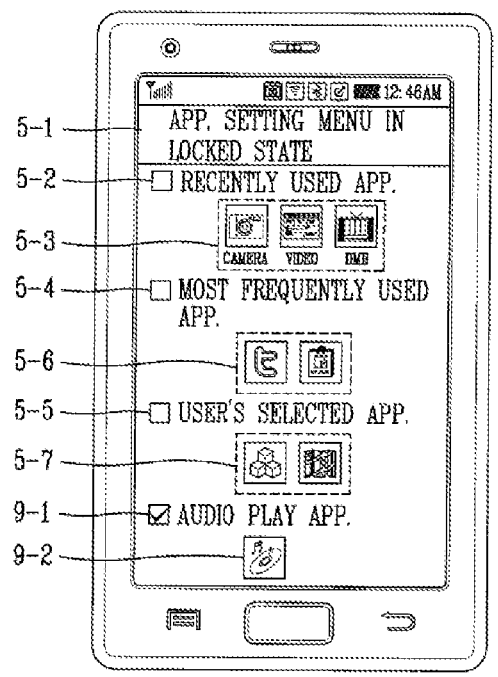
FIG. 9 is an overview illustrating an application program (APP) setting menu according to the third embodiment of the present invention.

First, the controller 401 sets an audio play application program through an application program (APP) setting menu according to the user's request (S31). For example, FIG. 9 is an overview illustrating an application program (APP) setting menu according to the third embodiment of the present invention. As illustrated in FIG. 9, the application program (APP) setting menu indicates a menu for setting a specific application program when the touch screen is in a locked state.

The application program (APP) setting menu in FIG. 9 is similar to that shown in FIG. 5 including the items 5-1, 5-4 and 5-5 along with the icons 5-3, 5-6 and 5-7, but also includes a fourth item 9-1 for setting an audio play application program.

The controller 401 also displays an icon 9-2 for implementing an audio (music) play application program on the fourth item 9-1 when the fourth item 9-1 within the application program (APP) setting menu is selected by the user. Here, the controller 401 may display (set) only the icons (application programs) selected by the user among the displayed icons.

Then, as shown in FIG. 8, the controller 401 determines whether the touch screen is in a locked state (S32). As discussed previously with respect to the first and second embodiments, the controller 401 can display a release lock icon, a window for requesting a password on the display unit when the lock release icon is touched by the user, and a background window (main display or main windows) on the display unit 402 when the password is entered.

Further, the controller 401 determines whether audio is being played when the touch screen is in the locked state (Yes in S32) and the audio play application program is set (selected) (S33). The controller 401 can also lock the touch screen when a predetermined period of time has passed while playing a music file or a power button is selected by the user. However, the music file can still be played even when the touch screen is locked.

The controller 401 then displays a key (or keys) (audio play key) for controlling audio play on the display unit 402 when the touch screen is in the locked state while the audio application is being played (S34). For example, the controller 401 can display a key (for example, PLAY, STOP, FAST FORWARD (FF), FAST REWIND (FR), NEXT/PREVIOUS SONG, etc.) for controlling the playing of a music file when the music file is being played while the touch screen is in the locked state. The controller 401 can also display a time bar indicating a music play time in the first display region.

Further, the controller 401 determines whether an audio play key displayed on the display unit 402 is selected by the user when the touch screen is in the locked state and audio is being played (S35). The controller 401 also controls audio play according to the selected key (S36) when the audio play key is selected by the user while the touch screen is in the locked state (Yes in S35).

Figure 10:
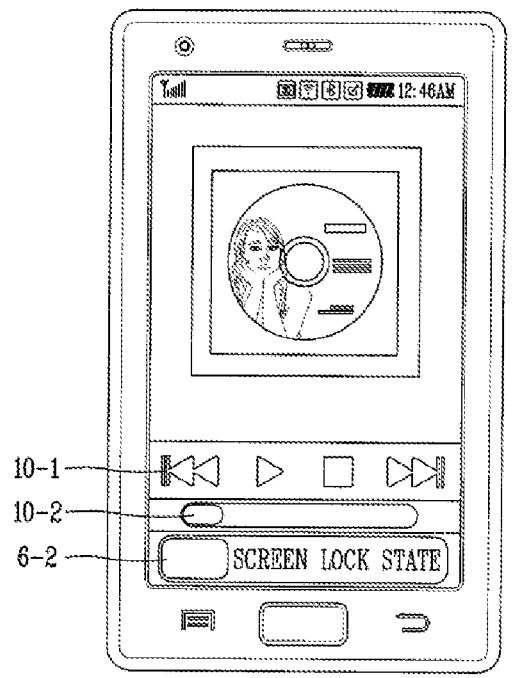
FIG. 10 is an overview illustrating an audio play key displayed on a lock screen when a touch screen according to the third embodiment of the present invention.

For example, FIG. 10 is an overview illustrating an audio play key displayed on the display unit 402 when the touch screen is in the locked state according to the third embodiment of the present invention. As illustrated in FIG. 10, the controller 401 displays a key (for example, PLAY, STOP, FAST FORWARD (FF), FAST REWIND (FR), etc.) 10-1 for controlling the playing of a music file on the first display region of the display unit 402 when the music file is being played while the touch screen is in the locked state, and displays an icon 6-2 for releasing the lock on the second display region when the touch screen is in the locked state. The controller 401 also activates only the first display region and the second display region, and deactivates all display regions excluding the first display region and second display region. The controller 401 may further display a time bar 10-2 indicating a music play time in the first display region.

As a result, according to the third embodiment of the present invention, a key (button) for controlling the playing of a music file on a touch screen in the locked state is displayed, thereby allowing the user to easily and quickly control the playing of the music file.

As described above, according to a content control apparatus and method thereof in accordance with the embodiments of the present invention, if an icon displayed on the display unit 402 is selected when the touch screen is in a locked state, an application program linked to the selected icon is executed, thereby easily and quickly implementing the user's desired application program even when the touch screen is in a locked state.

Further, an application program linked to the icon may be executed only when the touch screen is in a locked state and within a predetermined period of time, thereby reducing the battery consumption power of the mobile terminal. A key (button) for controlling the playing of a music file on a touch screen in a locked state can also be displayed when the touch screen is in a locked state and the music file is being played, thereby allowing the user to easily and quickly control the playing of the music file.

It will be apparent to those skilled in this art that various changes and modifications may be made thereto without departing from the gist of the present invention. Accordingly, it should be noted that the embodiments disclosed in the present invention are only illustrative and not limitative to the spirit of the present invention, and the scope of the spirit of the invention is not limited by those embodiments. The scope protected by the present invention should be construed by the accompanying claims, and all the spirit within the equivalent scope of the invention should be construed to be included in the scope of the right of the present invention.

What is claimed is:

1. A mobile terminal, comprising:
 a wireless communication unit configured to wirelessly communicate with at least one other terminal;
 a display unit including a touch screen; and
 a controller configured to:
 enter the mobile terminal into a locked state,
 display a lock screen on the display unit, said lock screen including first, second and third display regions,
 display, in the second display region, a lock release icon for releasing the locked state of the mobile terminal,
 display, in the first display region, audio controls keys for controlling an audio play function and a time bar indicating an audio play time of the audio play function while maintaining the mobile terminal in the locked state and while continuing to display the lock release icon, and
 display, in the third display region, an application program icon corresponding to an application program,
 wherein when the application program icon is displayed in the third display region, the corresponding application program is not executing and only the application program icon is displayed without any information related to the execution of the corresponding application program being displayed on the display.

2. The mobile terminal of claim 1, wherein the controller is further configured to receive a touch selection signal indicating a touching action on the lock release icon, to display a password window for requesting a password on the touch screen based on the received touch selection signal, and to display a background window on the touch screen when the password is entered.

3. The mobile terminal of claim 1, wherein the controller is further configured to receive a touch selection signal indicating a touching action on the audio control keys and to control the audio play function based on the received touch selection signal.

4. The mobile terminal of claim 1, wherein the controller is further configured to display an application setting menu for setting the audio control keys to be displayed on the lock screen.

5. The mobile terminal of claim 1, wherein the controller is further configured to count a predetermined amount of time from when the mobile terminal is entered into the locked state, and to remove the audio control keys from the lock screen when the predetermined amount of time has passed.

6. The mobile terminal of claim 1, wherein the controller is further configured to display the audio control keys and the time bar when a specific key is selected when the touch screen is in the locked state.

7. The mobile terminal of claim 1, wherein the application program icon is a camera application icon.

8. A method of controlling a mobile terminal, the method comprising:
 allowing, via a wireless communication unit of the mobile terminal, wirelessly communication with at least one other terminal;
 entering, via a controller, the mobile terminal into a locked state;
 displaying, via a display unit, a lock screen on a touch screen of the display unit, said lock screen including first, second and third display regions;
 displaying, in the second display region, a lock release icon for releasing the locked state of the mobile terminal;
 displaying, in the first display region, audio controls keys for controlling an audio play function and a time bar indicating an audio play time of the audio play function while maintaining the mobile terminal in the locked state and while continuing to display the lock release icon; and
 displaying, in the third display region, an application program icon corresponding to an application program,
 wherein when the application program icon is displayed in the third display region, the corresponding application program is not executing and only the application program icon is displayed without any information related to the execution of the corresponding application program being displayed on the display.

9. The method of claim 8, further comprising:
 receiving a touch selection signal indicating a touching action on the lock release icon;
 displaying a password window for requesting a password on the touch screen based on the received touch selection signal; and
 displaying a background window on the touch screen when the password is entered.

10. The method of claim 8, further comprising:
 receiving a touch selection signal indicating a touching action on the audio control keys; and
 control the audio play function based on the received touch selection signal.

11. The method of claim 8, further comprising:
 displaying an application setting menu for setting the audio control keys to be displayed on the lock screen.

12. The method of claim 8, further comprising:
 counting, via the controller, a predetermined amount of time from when the mobile terminal is entered into the locked state; and
 removing the audio control keys from the lock screen when the predetermined amount of time has passed.

13. The method of claim 8, wherein the displaying step displays the audio control keys and the time bar when a specific key is selected when the touch screen is in the locked state.

14. The method of claim 11, wherein the application program icon is a camera application icon.

* * * * *

UNITED STATES PATENT AND TRADEMARK OFFICE
CERTIFICATE OF CORRECTION

PATENT NO.         : 8,630,623 B2
APPLICATION NO.    : 13/296606
DATED              : January 14, 2014
INVENTOR(S)        : Jonghoon Park et al.

It is certified that error appears in the above-identified patent and that said Letters Patent is hereby corrected as shown below:

IN THE CLAIMS:

In claim 1, at column 15, line numbered 50, change "controls" to --control--.

In claim 8, at column 16, line numbered 38, change "controls" to --control--.

Signed and Sealed this
Twentieth Day of May, 2014

Michelle K. Lee
*Deputy Director of the United States Patent and Trademark Office*